United States Patent [19]

Higbee et al.

[11] 4,322,096
[45] Mar. 30, 1982

[54] PASSIVE RESTRAINT SYSTEM

[75] Inventors: Wallace C. Higbee, Romeo; Regis V. Pilarski, Utica, both of Mich.

[73] Assignee: The Firestone Tire & Rubber Company, Akron, Ohio

[21] Appl. No.: 964,699

[22] Filed: Nov. 29, 1978

[51] Int. Cl.³ .............................................. B60R 21/10
[52] U.S. Cl. ..................................... 280/804; 297/469
[58] Field of Search ....................... 280/804, 803, 802; 297/469

[56] References Cited

U.S. PATENT DOCUMENTS

| 3,583,726 | 6/1971 | Lindblad | 280/804 |
| 3,827,714 | 8/1974 | Lefeuvre | 280/804 |
| 4,138,142 | 2/1979 | Wize | 280/803 |
| 4,159,834 | 7/1979 | Miller | 280/802 |

FOREIGN PATENT DOCUMENTS 2501148  7/1976  Fed. Rep. of Germany ...... 280/804

Primary Examiner—John P. Silverstrim
Attorney, Agent, or Firm—Miller, Morriss and Pappas

[57] ABSTRACT

A passive restraint harness system is provided for deployment of a safety belt. The safety belt is a piece of webbing forming a lap belt portion and a cross chest portion. An upper anchor connects one end of the webbing to the upper rear edge of a vehicle door and a lower anchor connects to the other end of the webbing to the lower rear edge of the same vehicle door. A vehicle sensitive seat belt retractor located adjacent the seat of the user of the belt and inboard of the user is slidably connected to the piece of webbing forming lap and chest portions and urges it under a spring bias toward the retractor. This forms the lap belt portion and the shoulder or cross chest portion in respect to a seated user. A track is vertically oriented on the inner door face and fastened to the lower anchor. A slider is also on the track and the slider is over the webbing above the lower anchor. A traveler linkage is supported on the rear of the track and connected to the slider. The traveler linkage is connected by a cable element from the track to the hinge edge of the door. As the door is opened, the slider is raised on the track elevating the lap belt portion which is swung free with the cross chest portion of the webbing from across the user as the door is opened.

9 Claims, 6 Drawing Figures

PASSIVE RESTRAINT SYSTEM

BACKGROUND OF THE INVENTION

The concept of passive restraint safety belts and harness for automobiles has an origin reaching back at least to the work of David Oppenheim in U.S. Pat. No. 2,858,144 and Charles E. West in U.S. Pat. No. 2,919,140. The passive restraint concept originated in the desire to provide a safety restraining harness which would self-actuate as a consequence of normal entry of the user to the vehicle and exit therefrom and without the necessity for manual adjustment of the webbing or belting and without the manipulation of links, levers, fasteners, buckles or the like. The desirability of passive restraint safety harness is in the desire to provide improved user protection and avoid human error or the error of choice. In brief, if the user is left with no choice, the passive restraint harness provides protection. On leaving the vehicle, the user should be freed from the encumbrance of the safety belt or webbing without any manipulations beyond those normal to leaving the vehicle. The door of the car has been extensively exploited as an aid to deployment and to removal of harness as the user enters and quits the vehicle. There have been a substantial number of attempts to achieve an optimum system of minimum interference with the entry and exit habits of drivers and front seat passengers for vehicles. Some of these are seen in the U.S. Pat. Nos. 3,219,361 to Robert H. Brown; 3,411,602 to Robert E. Royce (including shoulder harness); 3,679,229 to Willem J. Weststrate; 4,029,339 to Yuishiro Kaneko, et al; and 4,084,841 to Toshiaki Hayashi, et al.

The present invention provides a substantial improvement over known prior work in providing a combination lap and chest passive restraint harness of great simplicity, with better deployment and retraction, and with comfort and optimum use of existing standard door construction. Great economy can be realized by using a single retractor at a strategic location on the inboard side of the user and achieving deployment across the chest and lap from the retractor to points adjacent the hip and outboard buttock of the user and above the outboard shoulder of the user and without requiring manipulation. The present harness system lifts on the lap portion as the door is opened and as the door swings outwardly on its forward hinges and free from seat obstruction. This results in ample room for freedom of ingress and egress. The track for the lift is face mounted on the door and emergency stressing is felt, not by the track, but by the anchor points on the door. While ideally suited to bucket seats, the system is also applicable to bench type seats.

GENERAL DESCRIPTION

In general, the present invention includes a pair of upper and lower fixed anchors for attachment to a vehicle door; a piece of webbing terminally connected to the anchors with an intermediate sliding attachment to a retractor and the retractor is located on the inboard side of a user between the seats; and a track with a webbing lifter vertically secured to the inside face of the door and including a traveler linkage whereby the lap belt portion of the piece of webbing is lifted when the door is opened, the traveler linkage being activated by tension transmitting means acting between the door and the door post. An upper fixed webbing anchor for attachment on the trailing edge of a vehicle door is provided and a lower fixed webbing anchor for attachment adjacent the trailing and lower edge of the same vehicle door is provided. A piece of safety belt webbing is then terminally connected to the two fixed anchors, the piece of webbing being sufficiently extensive to provide an upper run crossing the chest of the user and a lower run running across the lap of the user. A seat belt retractor is located adjacent the inboard hip of the user and is connected slidably to the safety belt webbing urging the disposition of both harness portions around the user in a restraint against forward or upward precipitous movement of the user in the seat in emergency situations. A substantially vertical track with traveler linkage is connected to the inner face of the vehicle door and the track includes a slider ring vertically movable up and down the track, the upward movement occurring with the opening of the vehicle door and the downward movement occurring as the door is closed. The lap portion of the webbing is trained over the slider ring so that as the ring is lifted, the lap belt is lifted above the seat and against the spring tension supplied by the retractor when the door is opened. Thus, both lap and chest webbing portions are swung away from contact with the user and are held away from dropping by the tension of the retractor in extended condition. The retractor is preferably of the vehicle sensitive type and inertially actuated but acceleration sensitive webbing retractors work well in prevention of webbing extension under emergency situations while allowing free movement of the webbing against the return tension under all other conditions. The slider ring on the track is operably connected by means of a traveler linkage and tension transmitting member, such as a cable, along the door and then to connection with the automobile body separate from the door. The usual connection of the cable is adjacent the hinge area so that as the door swings on the hinge an eccentric lever action or spreading action force is imparted to the cable causing the cable to lift the slider ring. This lift is against the return tension of the retractor so that as the door is closed the retractor picks up the slack as the slider ring returns down the track and with the door movement restores the harness in proper deployment over the lap and diagonally over the chest of the user. A buckle and tongue may be located at the upper fixed anchor so that the webbing harness may be manually removed under emergency or crisis as might occur, for example, after an accident in which the vehicle would have been turned over. The buckle may provide means for adjusting the total length of webbing available where desirable. While the connection of retractor webbing to the loop of the lap and chest harness is slidable and hence self-adjusting, it may under some circumstances be desirable to provide a buckle-tongue interlock at that point for selected disconnect. In operation, the occupants of front seats as, for example, the driver and front seat passenger simply open their respective doors and in so doing the cable at the hinge is tensioned and pulled thereby lifting the slider ring on the track while swinging both upper and lower anchor points forward and out. The result is to free the area for smooth entry to and exit from the vehicle and seat. Then, as the door is shut, the ring is dropped and drawn down the track toward the lower anchor by the tension imparted by the retractor acting on the lap portion of the webbing on door closure. The repositioning force is available from the retractor located inboard of the users and adjacent the inboard hip or buttock of the user. In emergency stopping the retractor locks against withdrawal and the harness restrains the user against being flung against adjoining structure. The stresses in the harness are connected to the body or frame at the retractor mounting and against the door structure. Thus, the door is actually secured against bursting outwardly and any added bursting stresses assists the user-passenger restraint.

IN THE DRAWINGS

SPECIFIC DESCRIPTION

Figure 1:
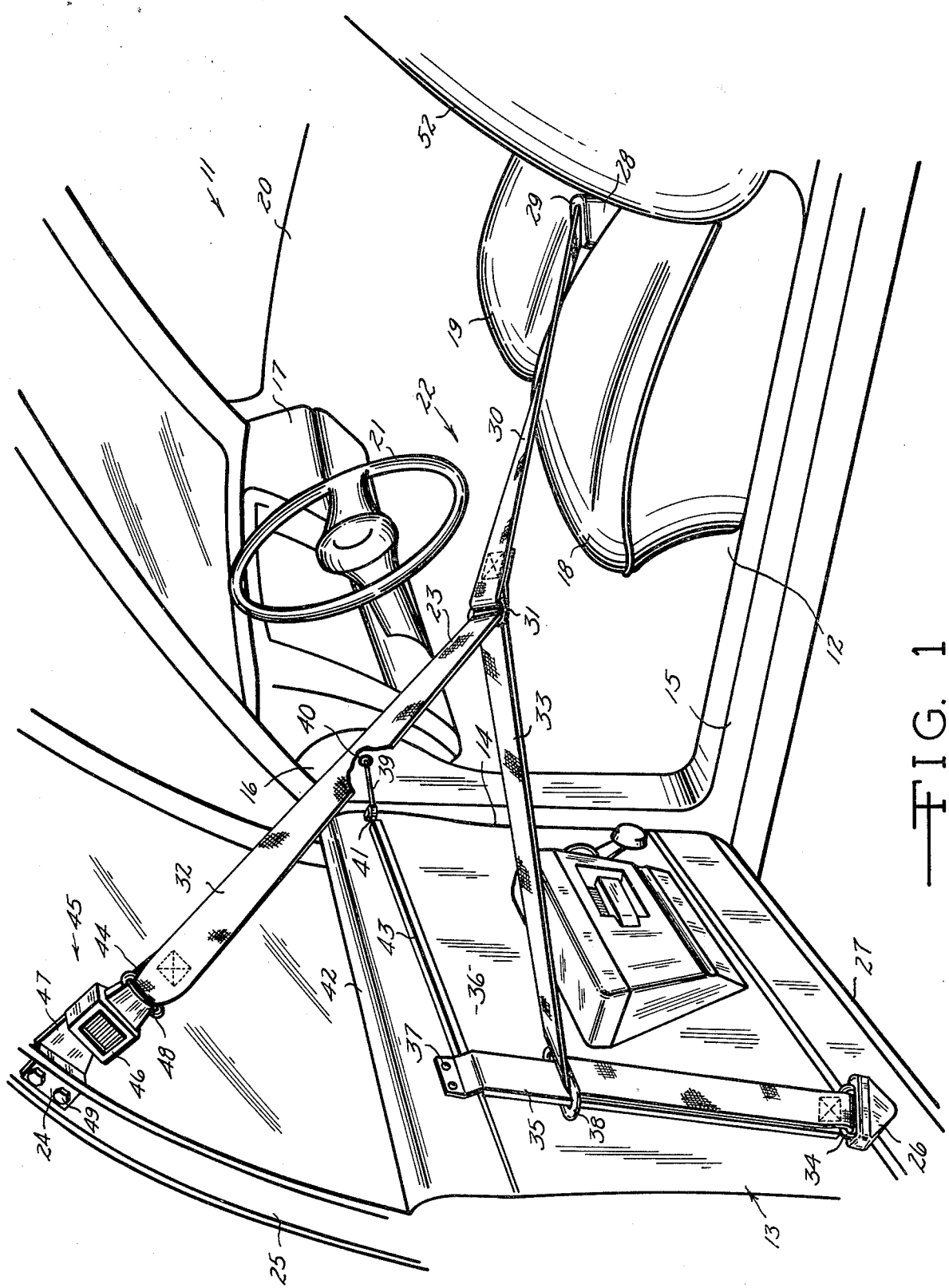
FIG. 1 is a partial perspective view of a vehicle with the driver side equipped with a passive restraint harness in accord with the present invention and illustrates the door adjacent the driver as open and the harness swung out of interference with ingress and egress to the vehicle.

Referring to the drawings and first specifically to FIG. 1 thereof, the present invention passive restraint harness can be best appreciated in its operative setting in a vehicle 11 such as an automobile which includes the body frame portion 12, at least one door 13 which hingedly is secured to the vehicle 11 at the leading edge 14 of the door, the perimeter door frame 15, the vehicle front post 16, instrument panel 17 and seats 18 and 19 adjacent the doors 13 and 20, respectively. The seat 18, as shown, accommodates a driver-user who, upon entry to the vehicle 11, is usually positioned behind the steering wheel 21. The seat 19 accommodates a passenger-user. The passive restraint harness 22 of the present invention includes a piece or length of webbing or belting 23 secured at one end to a fixed upper anchor 24 at the trailing edge 25 of the door 13 and positioned above the shoulder of a user and high on the door 13. At the other end the length of webbing or belting 23 is secured to a fixed anchor 26 adjacent the lower edge 27 of the door 13 and adjacent the trailing edge 25 of the door 13. A seat belt retractor 28, preferably of the vehicle sensitive type, such as an inertial retractor which is spring biased to rewind, is located between adjacent seats 18 and 19 and is anchored to the vehicle body or frame 12. Bucket seats 18 and 19 are shown but in bench seats the delivery boot 29 flares upward between seat back and bench so that the retractor webbing 30 is smoothly extendable and retractable from and to that point connected by the slip ring 31 over the piece of webbing 23 and adjustably providing a cross chest portion 32 of webbing 23 and a cross lap portion 33 of webbing 23. The lap portion 33 is terminally connected to the lower anchor 26 as by stitching to the anchor bail 34. The anchor 26 is also a convenient means for connection of the track element 35 to the door facing 36 and the track element 35 is secured at the top to the door facing 36 by fasteners such as screws 37. A slider ring 38 which is movable up and down the track 35 trains the movement of lap portion 33 thereover and in a slip relation. A traveler ring activated by a tension transmitting means such as the cable 39 is secured to the front door post 16 substantially at the instrument panel 17 as by the gripper 40. A sheave or pulley 41 provides a motion translating means secured to the door 13 at the leading or hinge edge 14 as, for example, seen adjacent the window trim 42 and the cable 39 is then concealed in a trim cover 43 under which the cable 39 runs to the track 35 to operable connection to the slider ring 38 and concealed behind the track 35.

The upper terminal end 44 of the webbing 23 and cross chest portion 32 thereof is connected to the upper fixed anchor 24 and the connection 45 may be of the disconnect type where a buckle 46 and tongue 47 are a part of the connection. As shown, the base 48 of the push button buckle 46 is made an extension of the fixed anchor 24 via connection 45 and is secured to the door 13 by fasteners 49 such as bolts. Those skilled in the art will appreciate that in some instances the tongue element 47 may be made integral with the base 48 of the buckle 46 and the buckle 46 may be adjustably and connectably secured to the upper end 44 of the webbing portion 32 as by a webbing connector tongue well known in the art without departure from the spirit of the invention. In other instances, the buckle 46 may be eliminated and the webbing 23 connected directly as by stitching to the anchor 24. The preferred embodiment is shown allowing an emergency release of the webbing 23.

Figure 2:
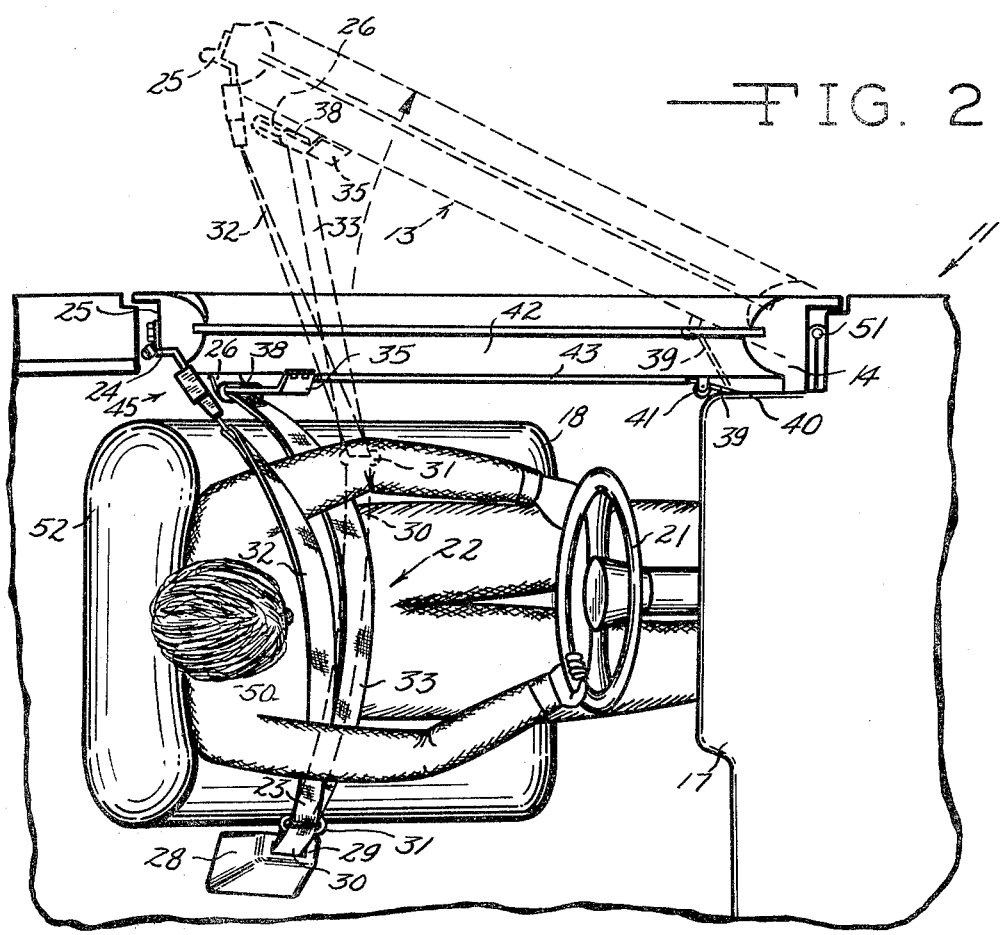
FIG. 2 is a partial cutaway top plan view of the vehicle seen in FIG. 1 and showing the door as closed in full lines and as open in phantom line in relation to the driver of the vehicle.

By reference to FIG. 2, the functioning of the passive restraint harness 22 of the present invention may be better comprehended since the door 13 is first shown closed in full line and then shown open in phantom line with the harness 22 in tension by the retractor 28 through the entire movement of the door 13 and the slider ring 38 lifting the lap belt portion 33 up and away from the body of the user 50. As will be seen, the lifting action by cable 39 is in an amount of movement depending upon the swing of the door 13 on hinge 51 and including any added lift by reason of the block and tackle rigging for lifting the sliding ring 38 in the track 35. The track 35 is tilted slightly toward the front of the vehicle 11, as shown on the drawing, from the lower fixed anchor 26 adjacent the lower edge 27 and trailing edge 25 of the door 13.

From FIG. 2 the general geometry of release of the harness 22 upon opening of the door 13 can be appreciated. The trailing edge 25 of the door 13 is in general alignment with the seat back 52 when the door 13 is closed and the lap portion 33 of the restraint harness 22 runs to the lower anchor 26 from the retractor 28 in substantially a straight line paralleling the seat back 52 and the upper torso or chest portion 32 is also in a substantially straight line run between the upper anchor 24 and retractor 28. With a user 50 in position, there is a bow of the harness 22 around the body, as seen. As the door 13 opens, the webbing runs 32 and 33 are repositioned by the combination of door movement and slider 38 elevating in the track 35. This is best appreciated by the fact that the slip ring 31 attached to the webbing 30 of retractor 28 has moved across the body of the user 50 to a position above the outboard side of the seat 18, as shown. The harness 22 is thus swung free of the user 50 who can slip in and out of the seat 18 and through the open door 13. Movement of the seat 18 forwardly or rearwardly, within usual limits, has little or no impact on the performance of the invention, the mean position being shown.

The inboard location of the retractor 28 is indicated and while only the seat 18 is shown, it will be appreciated that the seat 19, as shown in FIG. 1, may be located adjacent to the seat 18 and another retractor 28 may be provided to be connected to a harness structure serving a passenger-user in seat 19 as otherwise described in seat 18. In the case of bench seats, the retractors may feed webbing up between the back and bench portion of such seats. From the FIG. 3 it can also be best appreciated that the passive restraint harness 22 is applicable directly to the face 36 of doors 13 requiring only a cosmetic concealment of the cable 39 under the cover strip 43. The anchors 24 and 26 are firmly bolted through the door at strong points and the track 35 is easily fastened at the desired angle and position by the fasteners 37 (FIG. 1). As a matter of economy, it has been found helpful to employ a retractor 28 of the dual spool type where a single retractor frame serves spools running across seats 18 and 19. Such a dual spool retractor, while known in the art, is not illustrated. The retractors 28 are preferred as vehicle sensitive.

Figure 3:
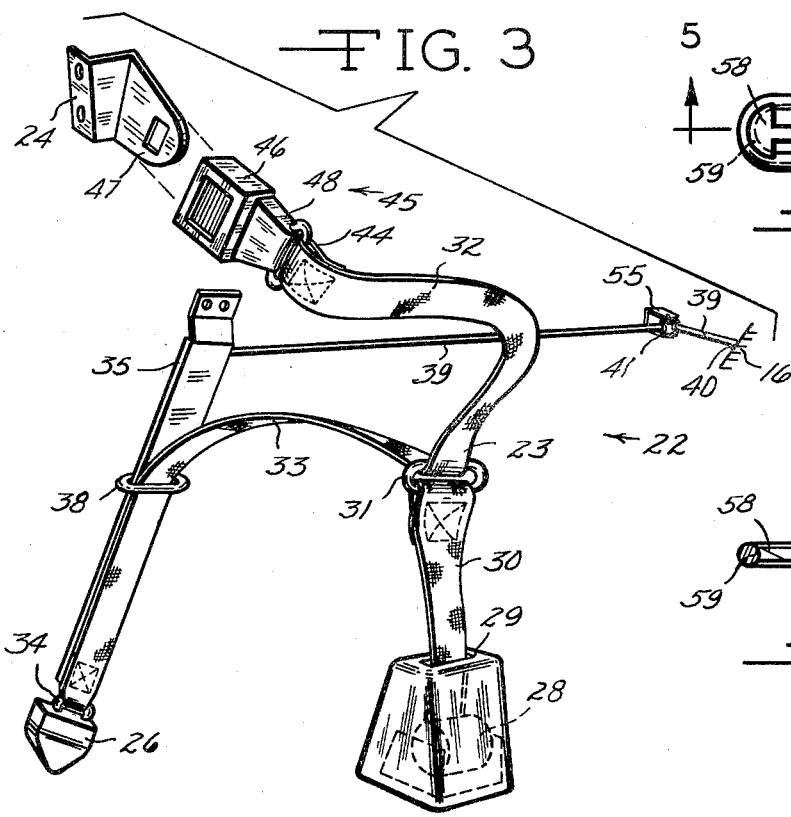
FIG. 3 is a perspective view of the passive restraint harness of the present invention isolated from the vehicle except as schematically connected by means of the cable at the door frame.

The FIG. 3 shows the harness structure 22 removed from connection to the vehicle 11 except for the schematic connection of the cable 39 to the post 16. The pulley 41 provides a fair lead for the cable 39 along the door 13 and the pulley bracket 55 is connected to the door 13 as shown in FIGS. 1 and 2. In the FIG. 3 the buckle 46 has been disconnected from the anchor 24 and the tongue portion 47 is revealed.

Figure 4:
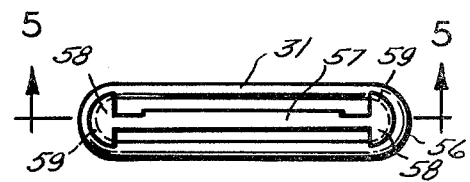
FIG. 4 is a top plan view of the slider ring for connecting the continuous run of webbing to the webbing of the retractor.
Figure 5:
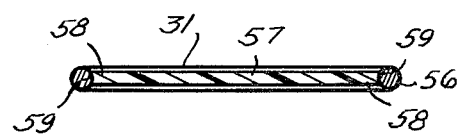
FIG. 5 is a cross section elevation view of the slider shown in FIG. 4 and indicating the snap-in retention of the slider insert.

In FIGS. 4 and 5 the slider connector 31 which connects to the outward end of the retractor webbing 30 and slidably connects to the continuous webbing piece 23 separating the chest portion 32 from the lap portion 33 is best understood as comprising an outer ring 56 having a generally ovoid construction (usually in metal) and bridged from end to end by a webbing smoother and separator insert 57. The separator 57 is terminally configured in hemispheric segments 58 each with a channelled perimeter 59 mating with the end internal curvature of the ring 56. The material is a plastic material having good anti-friction properties and good impact strength and capable of being injection molded to high precision so that it may be snapped into the ring, as shown, and the insert 57 then defines running slots 58 and 59 so that the webbing 23 does not kink while running and the retractor webbing 30 may be sewn to the ring 31 without the two webbing portions frictionally encountering each other. This extends the life of the webbing in avoiding of chafe and in avoidance of the webbing doubling over on itself. The guidance provided by the insert 57 is extremely helpful.

Figure 6:
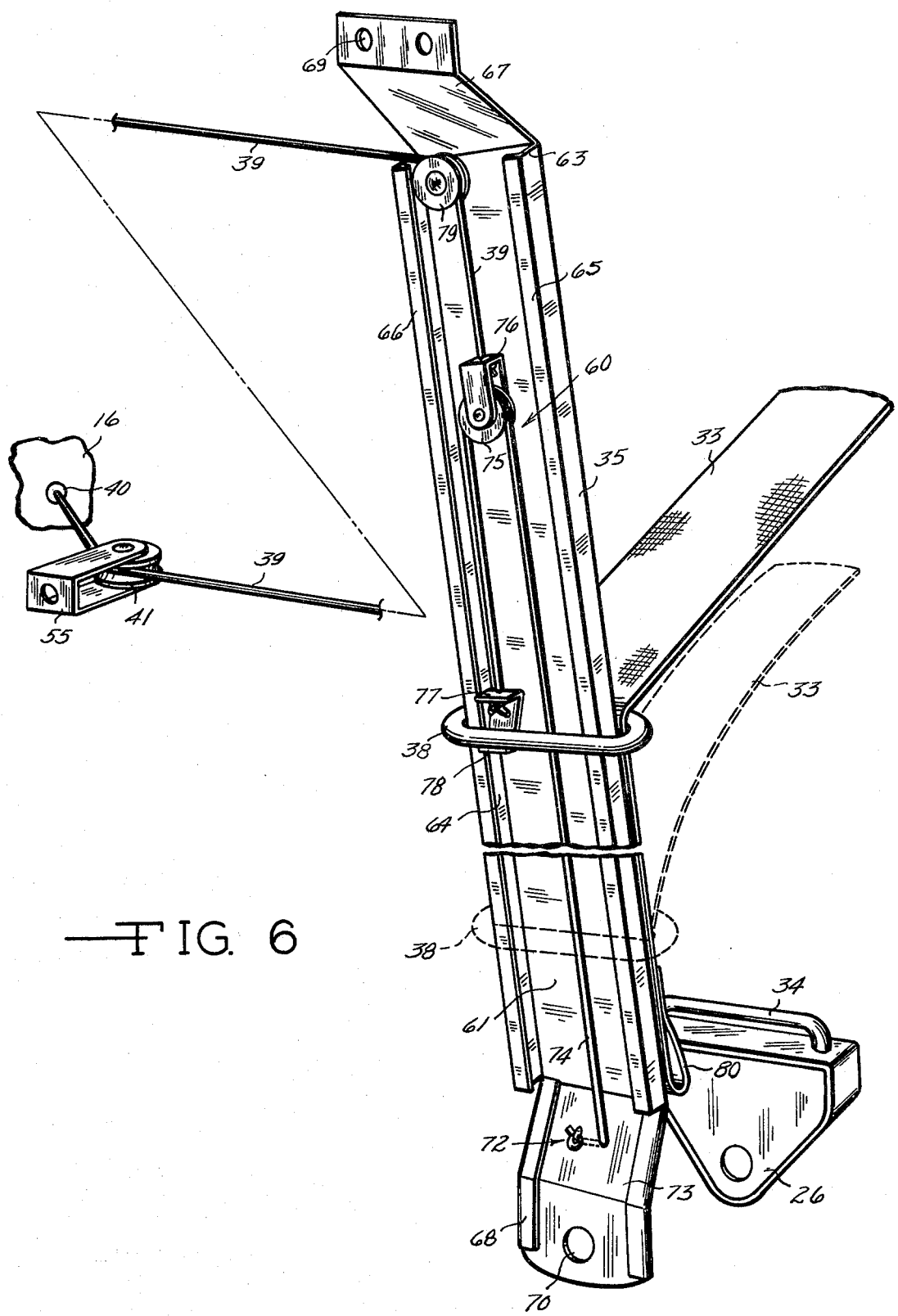
FIG. 6 is a somewhat schematic exploded perspective view of the track slider and cable suspension and related to the lower door anchor.

In FIG. 6 the track 35 is best understood in relation to the functioning of the lift of the slider ring 38 by the block and tackle 60 which functions from the movement of cable 39. As previously described, the cable 39 is moved by opening and closing the vehicle door 13 and the cable 39 being attached to the slider ring 38 causes the slider ring 38 to move up and down on the track 35. The track 35 is an elongate channel shaped plate. On attachment of the track 35 to the door 13, only the web portion 61 is visible along with the mounting tabs, as will be seen. The web portion 61 thus conceals the block and tackle rigging 60 and the flanges 63 and 64 include inturned edges 65 and 66, respectively. This provides a stand-off clearance for mounting the rigging 60, set off from the door facing 36, and with the appropriate set off to allow the slider ring 38 to be guidably moved on the track 35. The web 61 is extended at top and bottom forming the mounting tabs 67 (top) and 68 (bottom). These are bent inwardly so that mounting openings 69 and 70 fit flush against the door face 36, the upper tab 67 being secured by fasteners 37 (FIG. 1) and the lower tab being secured at the anchor 26 by a fastener covered by an anchor cover plate upon installation. The lower tab includes cable fastening means 72 in the offset portion (shown as openings) and to which the terminal end of a cable 74 is attached. The cable or tension member 74 is thus concealed in its upward course within the channel portion of the track 35. The cable 74 runs operably over the movable block or pulley 75 and to the slider ring 38. The block 75 is journalled and supported by its clevis housing 76 and the housing 76 is connected to the lower terminal end of the cable 39. The cable 74 runs down from the block 75 to lift connection with the slider ring 38. This connection is facilitated by the lifter element 77 which runs in the channel portion of the track 35 but includes a lift finger 78 in lift contact support of the slider ring 38. Attachment may be by welding, brazing or other means of integral connection between lifter 77 and ring 38. The cable 39 runs upward from the clevis housing 76 of movable block 75 and over a fixed pulley or sheave 79 operably nested at the top end of the channel portion of the track 35. This trains the cable 39 along the trim 43 under the window of the door 13 and to the pulley 41 and thence to connection with the door post 16 at point 40. The lower end of the lap belt portion 33 of webbing 23 includes a loop 80 which is sewn over or otherwise secured to the anchor 26 as on the bail 34 of the anchor 26. Then the webbing 33 is trained upward and into and over the ring slider 38 (between ring 38 and web portion of track 35) and thence to connection with the upper anchor 24 (FIGS. 1, 2 and 3). As will be appreciated, the surplus webbing between the anchors 24 and 26 is sufficient to form the webbing 23 into the lap belt portion 33 and cross chest portion 32 and connected to the retractor webbing 30 at the slip ring 31 adjacent the retractor 28 when the door 13 is closed. At ring 31 (connection to retractor webbing 30) the direction of the webbing 23 is reversed and the cross chest portion 32 runs up to the connection at anchor 24. As shown in phantom line, the slider ring 38 moves downwardly adjacent the fixed anchor 26 when the door 13 is closed. However, when the door 13 is opened, the block and tackle rigging 60 which provides the lift connection to the track mounted slider ring 38 provides a 2 to 1 movement advantage and elevates the ring 38 at a distance double that of the cable movement at the door 13 between pulley 41 and post connection 40. By means of the retractor 28 and retractor web 30, tension is maintained on the cable 39 at all times during opening and closing and the resilient movement of the webbing 30 in the retractor 28 results in adjustment to the sizes and position of individual users.

As will be appreciated, the described structure is easily mounted to existing door structures without radical structural revisions and crash stresses are taken at both upper and lower fixed anchors and are dissipated into the structure of the vehicle. The retractor 28 is secured to the vehicle frame 12 and is located in an out-of-the way available location behind or under the seats 18 and 19 and the webbing 30 can be conveniently led from the retractor to the use position for connection with the continuous restraint webbing 23. This assures economy and adaptability of this passive restraint harness to new and existing automotive construction and in avoidance of radical redesign. The structure is also cosmetically expedient without extensive aesthetic revision of the door.

In operation, as the door 13 is opened from inside or out (FIG. 3), the front seat webbing is carried upward on the track 35 and outwardly by the door swing so that easy ingress or access is provided without sacrifice of safety performance. On closure of the door the restraint is restored as an incident of the cooperative function of hinge, cable and spring bias from the retractor. Under special emergencies disconnect is simple and readily available at the buckle 46.

Having thus described the invention and a preferred embodiment thereof, those skilled in the art will perceive changes, improvements and modifications within the skill of the art and such changes, modifications and improvements are intended to be included hereunder limited only by the scope of the hereinafter appended claims.

We claim:

1. A passive restraint harness for automatic deployment of safety belt webbing comprising:
   an upper fixed webbing anchor on the trailing edge and near the top edge of a vehicle door;
   a lower fixed webbing anchor adjacent the trailing edge and lower edge of a vehicle door;
   safety belt webbing interconnecting said two fixed anchors;
   a retractor adjacent the inboard hip of a person seated adjacent said door;
   means slidably connecting the intermediate portion of said webbing to said retractor;
   a track assembly having a substantially vertical track secured to said door in a stand-off facing relationship;
   a slider ring over said track and movable vertically thereon and over which is trained said webbing;
   a cable means connected to said ring and to the vehicle through said door whereby upon opening said door said ring is lifted and on closing said door said ring is lowered on said track whereby lifting of said ring lifts said webbing out-of-contact with said person as said connecting means is withdrawn from said retractor.

2. In the combination of claim 1 wherein said slider ring on said track is connected to a tension transmitting element through said door and through the leading edge of said door into the body of said vehicle whereby said slider ring is lifted along said track when said door is opened.

3. In the combination of claim 2 wherein said tension transmitting element is connected to said slider ring via a block and tackle rigging with mechanical and lift advantage.

4. In the combination of claim 1 wherein a buckle is positioned at said upper fixed anchor, one side secured to said webbing belt and one side to said upper anchor whereby said belt may be manually disconnected from said door at said upper anchor.

5. In the combination of claim 1 wherein said retractor is an emergency locking retractor.

6. In the combination of claim 5 wherein said emergency locking retractor is of the vehicle sensitive type.

7. A door connected restraint harness for automatic deployment of safety belt comprising:
   a piece of safety belt webbing of a length to include a lap belt portion and a cross chest portion;
   an upper fixed webbing anchor secured adjacent the trailing edge and near the top edge of a vehicle door and detachably secured to the upper end of said piece of safety belt webbing;
   a lower fixed webbing anchor adjacent the trailing edge and lower edge of the same said vehicle door and said anchor secured to the lower end of said piece of safety belt webbing;
   a substantially vertical track on the inner face of said door and secured at the bottom to said door at said lower fixed anchor plate, said track connected to said door in a stand-off facing relation;
   a slider ring over said track and movable vertically thereon and over which is trained the lap belt portion of said piece of webbing;
   a cable means concealed in said track and connected to said ring and to the vehicle through said door whereby upon opening said door said ring is lifted and on closing said door said ring is lowered on said track;
   a seat adjacent said door; and
   a vehicle sensitive retractor connected to said vehicle on the inboard side of a user of said seat and said retractor operably and slidably connected to said piece of webbing intermediate the ends thereof and upon the opening of said door said retractor extending with the movement of said door whereby said lap and said cross chest portions of webbing are moved away from said seat and upwardly on said track, and upon closing said door said retractor restores said webbing to its deployed condition.

8. In the structure of claim 7 wherein said cable means includes a block and tackle rigging providing added lift and mechanical advantage.

9. In the structure of claim 7 wherein the connection between said retractor and said piece of webbing is by means of a slider ring having a webbing run separator thereby avoiding friction between said piece of webbing and said retractor connection.

* * * * *